United States Patent
Nishimura et al.

(10) Patent No.: US 11,034,313 B2
(45) Date of Patent: Jun. 15, 2021

(54) WIRE HARNESS ARRANGEMENT STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Tetsuya Nishimura, Mie (JP); Shigeki Ikeda, Mie (JP); Daisuke Ebata, Mie (JP); Ryuta Takakura, Mie (JP); Kenta Arai, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/605,326

(22) PCT Filed: Aug. 20, 2018

(86) PCT No.: PCT/JP2018/030644
§ 371 (c)(1),
(2) Date: Oct. 15, 2019

(87) PCT Pub. No.: WO2019/097788
PCT Pub. Date: May 23, 2019

(65) Prior Publication Data
US 2021/0024019 A1    Jan. 28, 2021

(30) Foreign Application Priority Data
Nov. 17, 2017 (JP) .............................. JP2017-221679

(51) Int. Cl.
*B60R 16/02* (2006.01)
*H02G 3/04* (2006.01)
*H02G 3/38* (2006.01)

(52) U.S. Cl.
CPC ....... *B60R 16/0215* (2013.01); *H02G 3/0437* (2013.01); *H02G 3/383* (2013.01)

(58) Field of Classification Search
CPC .. B60R 16/0215; B60R 16/02; H02G 3/0437; H02G 3/383
(Continued)

(56) References Cited

U.S. PATENT DOCUMENTS 6,142,556 A * 11/2000 Tanaka ................ B60R 16/0207
174/72 A
9,661,792 B2 * 5/2017 Wakabayashi ....... H02G 3/0487
(Continued)

FOREIGN PATENT DOCUMENTS

| CN | 105379037 A | 3/2016 |
| CN | 205104857 U | 3/2016 |

(Continued)

OTHER PUBLICATIONS

Indian Office Action, Indian Patent Office, Application No. 201917041709, dated Aug. 19, 2020, with English.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness arrangement structure includes a silencer, the wire harness, and a cover. The silencer includes a silencer body with a groove recessed in a thickness direction is formed in a main surface of the silencer body. The groove houses at least part of the wire harness. The cover includes (Continued)

a pair of legs covering both lateral sides of the wire harness housed in the groove and a lid covering an upper side of the wire harness housed in the groove and coupling the pair of legs together, and is open at a bottom side of the groove.

6 Claims, 4 Drawing Sheets

(58) Field of Classification Search
USPC .......................................................... 174/72 A
See application file for complete search history.

(56) References Cited

U.S. PATENT DOCUMENTS

| | | |
|---|---|---|
| 2003/0169576 A1 | 9/2003 | Kisu |
| 2016/0121820 A1 | 5/2016 | Inao et al. |
| 2017/0232867 A1 | 8/2017 | Fukazu et al. |
| 2017/0313266 A1 | 11/2017 | Mizuno et al. |

FOREIGN PATENT DOCUMENTS

| | | |
|---|---|---|
| CN | 107082050 A | 8/2017 |
| CN | 107148372 A | 9/2017 |
| DE | 10145357 C1 | 5/2003 |
| JP | 63-166635 | 7/1988 |
| JP | 8-93200 | 4/1996 |
| JP | 9-23548 | 1/1997 |
| JP | 2011-240819 | 12/2011 |
| JP | 5895614 B2 | 3/2016 |
| WO | 2012/141649 A1 | 10/2018 |

OTHER PUBLICATIONS

Chinese Office Action, Chinese Patent Office, Application No. 201880026115.4, dated Apr. 17, 2020, English translation.
U.S. Appl. No. 16/607,496 to Housei Mizuno et al., filed Oct. 23, 2019.
U.S. Appl. No. 16/619,730 to Haruka Nakano et al., filed Dec. 5, 2019.
International Search Report issued in International Patent Application No. PCT/JP2018/030644, dated Sep. 11, 2018 (in English).
Chinese Office Action, Chinese Patent Office, Application No. 201880026115.4, dated Feb. 2, 2021, English translation.
Chinese Notice of Allowance, Chinese Patent Office, Application No. 201880026115.4, dated Apr. 21, 2021.

* cited by examiner

WIRE HARNESS ARRANGEMENT STRUCTURE

TECHNICAL FIELD

The present invention relates to a wire harness arrangement structure provided in a vehicle.

BACKGROUND ART

Patent Document 1 discloses a technique of embedding a wire harness in a urethane member (used as a silencer, for example) embedded between a body in a bottom part of an automobile and a floor mat for purpose of acoustic insulation and flattening a concavo-convex shape, for example. Herein, the wire harness in Patent Document 1 is embedded in a part provided along a side sill (also referred to as a rocker part, for example) or a part provided along a cross member in the urethane member to prevent an occupant from stepping on the wire harness.

PRIOR ART DOCUMENTS

Patent Documents

Patent Document 1: Japanese Patent Application Laid-Open No. 63-166635

SUMMARY

Problem to be Solved by the Invention

Recently, the number of electrical wires tends to increase, thus there is a possibility that the wire harness is not fit within a conventional installation space such as the part along the side sill or the part along the cross member described above. Thus, an increase in a degree of freedom in arranging the wire harness is required.

However, when the wire harness is arranged in the silencer, there is a high possibility that a space where the wire harness is not conventionally arranged is highly influenced by a stepping by the occupant, so that measures against it need to be newly implemented.

An object of the present invention is to provide a technique capable of easily implementing measures against a stepping by an occupant in arranging a wire harness in an any position in a silencer.

Means to Solve the Problem

To solve the problem described above, a wire harness arrangement structure according to a first aspect is the wire harness arrangement structure in a vehicle and includes: a silencer including a silencer body with a groove recessed in a thickness direction formed in a main surface of the silencer body; a wire harness, at least a part of which is housed in the groove; and a cover which includes a pair of legs covering both lateral sides of the wire harness housed in the groove, a lid covering an upper side of the wire harness housed in the groove and coupling the pair of legs together, and an opening on a bottom side of the groove. The cover is formed harder than the silencer, the cover is formed to be deformable so that the lid recesses and an opening at the bottom side of the groove extends outward when a force in a normal line direction with respect to a main surface of the lid is applied on the lid, and the silencer can be deformed so that a part supporting the wire harness bows when the lid presses the wire harness in deformation of the cover.

A wire harness arrangement structure according to a second aspect is the wire harness arrangement structure according to the first aspect further including a carpet covering the silencer, wherein the cover is formed separately from the carpet, using rigid plastic as a material.

A wire harness arrangement structure according to a third aspect is the wire harness arrangement structure according to the second aspect, wherein the lid is formed lower in height than a main surface of a part of the silencer adjacent to the groove.

A wire harness arrangement structure according to a fourth aspect is the wire harness arrangement structure according to the first aspect further including a carpet covering the silencer and integrally formed with the cover.

A wire harness arrangement structure according to a fifth aspect is the wire harness arrangement structure according to any one of the first to fourth aspects, wherein the part of the wire harness housed in the groove is flatly formed.

A wire harness arrangement structure according to a sixth aspect is the wire harness arrangement structure according to any one of the first to fifth aspects, wherein the wire harness has a foot arrangement part arranged in a position where feet of an occupant are located, and the groove and the cover are provided on the foot arrangement part.

Effects of the Invention

According to the first to sixth aspects, the cover is open at the bottom side of the groove, thus the cover can be put above the wire harness being housed in the groove. Furthermore, since the cover is open at the bottom side of the groove, an opening side of the cover can be deformed to extend outward when a lid side of the cover is stepped, thus the force can be easily let out. Accordingly, measures against the stepping by the occupant can be easily implemented.

According to the second aspect, stiffness of the cover can be easily increased.

According to the third aspect, when a region in the silencer including the groove is stepped, the part adjacent to the groove is stepped in advance of the cover. Accordingly, a feeling of strangeness occurring in stepping a hard member can be reduced.

According to the fourth aspect, the number of components which needs to be mounted on the vehicle can be reduced.

According to the fifth aspect, a depth of the groove can be reduced. Accordingly, a reduction in sound insulating properties of a silencer can be suppressed.

According to the sixth aspect, measures against the stepping can also be easily implemented in a part where the stepping occurs.

DESCRIPTION OF EMBODIMENT(S)

First Embodiment

Figure 1:
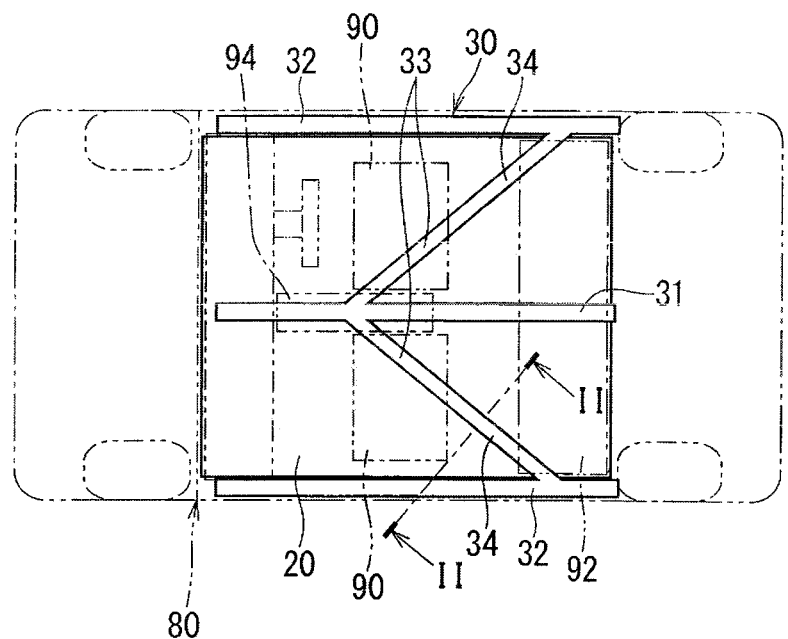
FIG. 1 A schematic plan view illustrating an arrangement route of a wire harness in a wire harness arrangement structure according to a first embodiment.
Figure 2:
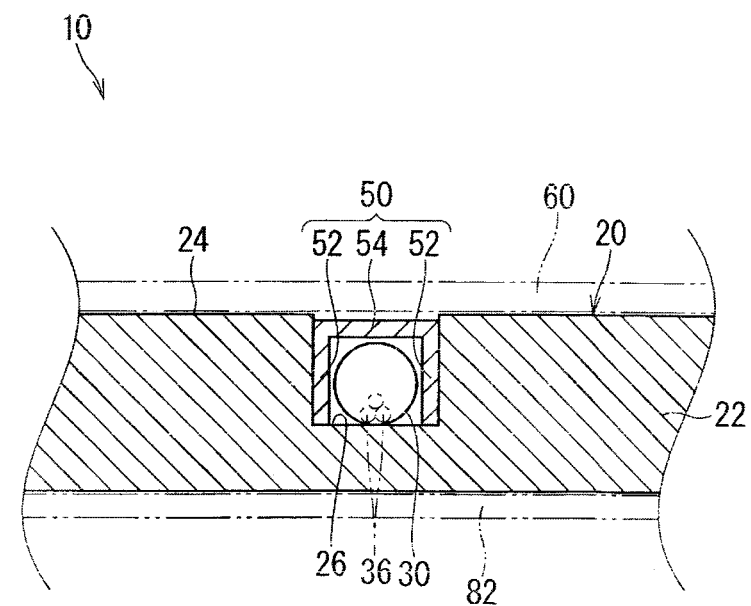
FIG. 2 A cross-sectional view of the wire harness arrangement structure cut along a II-II line in FIG. 1.
Figure 3:
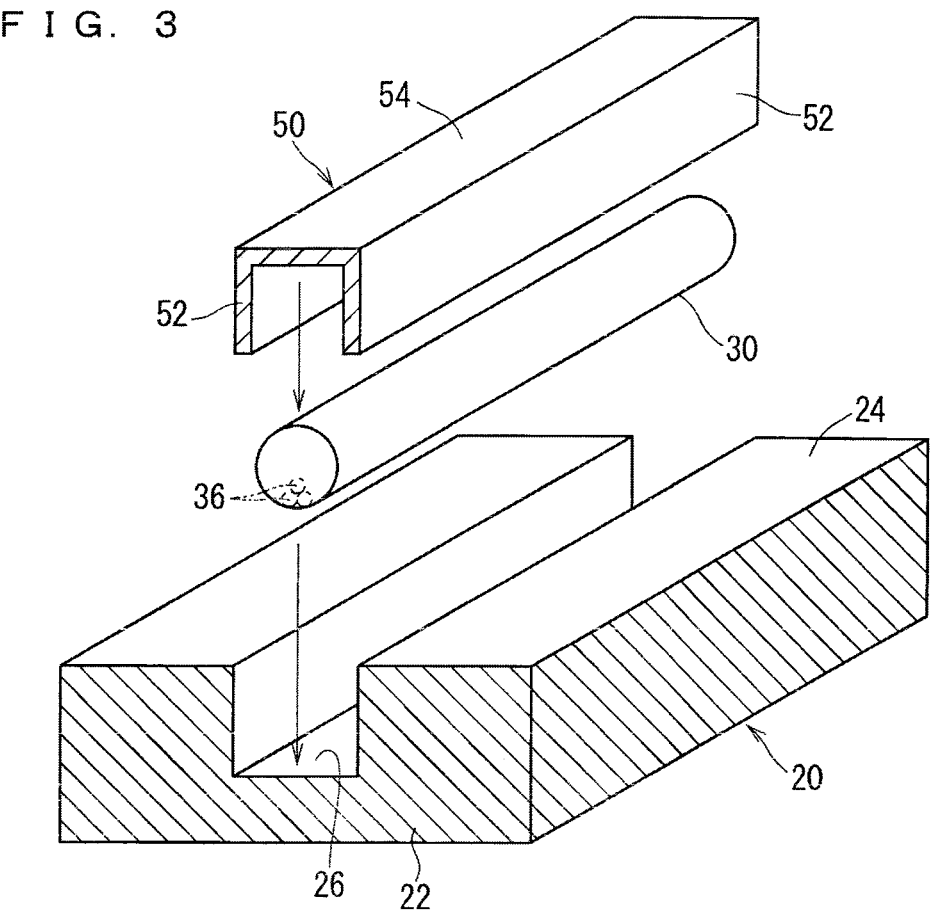
FIG. 3 An explanation diagram illustrating a manufacture of the wire harness arrangement structure.

A wire harness arrangement structure according to a first embodiment is described hereinafter. FIG. 1 is a schematic plan view illustrating an arrangement route of a wire harness 30 in a wire harness arrangement structure 10 according to the first embodiment. FIG. 2 is a cross-sectional view of the wire harness arrangement structure 10 cut along a II-II line in FIG. 1. FIG. 3 is an explanation diagram illustrating a manufacture of the wire harness arrangement structure 10.

The wire harness arrangement structure 10 includes a silencer 20, the wire harness 30, and a cover 50. The wire harness arrangement structure 10 further includes a carpet 60.

The silencer 20 includes a silencer body 22. For example, the silencer body 22 is formed of numberless compressed fibrous members. In this case, the numberless fibrous members may be entangled with and bonded to each other, or may also be fixed by an adhesive agent, for example. The fibrous members may be made up of natural fiber or chemical fiber. A method of manufacturing the silencer body 22 is not limited thereto described above. For example, the silencer body 22 may be formed by foaming a resin material such as polyurethane and performing mold forming on the resin material, or also may be formed of a material of a non-woven fabric. For example, the silencer body 22 may be formed by mixing a chip of a resin foam such as foamed polyurethane with an adhesive agent (binder) applied to the chip and then compressing and integrally fixing them under vapor atmosphere. A known adhesive agent, such as a urethane chip adhesive agent, according to a material of the chip can be applied as the adhesive agent. The silencer body 22 is placed on a floor panel 82 in a vehicle body 80, for example. A concavo-convex shape or a shape with a different thickness not shown, for example, is formed in a main surface of the silencer body 22 on a side of a floor panel 82 to be able to absorb a concavo-convex shape formed in the floor panel 82 in some cases. A groove 26 recessed in a thickness direction is formed in a main surface 24 (a main surface on an opposite side of the floor panel 82) of the silencer body 22.

The groove 26 is formed to be able to house the wire harness 30. The groove 26 is formed to extend in accordance with an arrangement route of the wire harness 30. In the example illustrated in FIG. 2, the groove 26 is formed so that a horizontal section has a rectangular shape, however, the shape of the horizontal section of the groove 26 is not limited thereto. For example, the groove 26 may be formed so that the horizontal section has a trapezoidal shape. In this case, the groove 26 may be formed to be gradually wider in width from a bottom side toward an opening side, or may also be formed to be gradually narrower from the bottom side toward the opening side. In the example illustrated in FIG. 3, the groove 26 is formed so that the shape or a size, for example, of the horizontal section does not change along an extension direction, but may be formed so that the shape or the size changes. For example, it is also considered that the groove 26 is formed so that the horizontal section is large in area in a part housing the relatively thick wire harness 30 and small in a part housing the relatively thin wire harness 30. In the example illustrated in FIG. 3, the groove 26 is formed to have only a straight portion, but may be formed to have only a curved portion which is curved, or may be formed to have both the straight portion and the curved portion. The groove 26 may have a branched portion.

The wire harness 30 includes a plurality of electrical wires 36. Each electrical wire 36 is an insulated electrical wire 36 including a conductive core wire and an insulation covering which covers a periphery of the conductive core wire, for example. The wire harness 30 is connected to an apparatus disposed in a vehicle or the other wire harness via a connector connected to an end of the electrical wire 36, for example. The groove 26 houses at least part of the wire harness 30.

In the example illustrated in FIG. 1, the wire harness 30 has parts extending in a front-rear direction in a center position and both lateral side position in the vehicle. These parts are referred to as a center extension part 31 and a lateral extension part 32 in some cases hereinafter. The wire harness 30 has a part obliquely extending from a center on a front side toward a lateral on a rear side in the vehicle. This part is referred to as an oblique extension part 33 in some cases hereinafter. The wire harness 30 has a foot arrangement part 34 arranged in a position where feet of the occupant are located. Herein, the position where the feet of the occupant are located indicates a position where the feet of the occupant are located in a state where the occupant sits in a seat in a normal posture. Part of the oblique extension part 33 constitutes the foot arrangement part 34 herein. More specifically, in the example illustrated in FIG. 1, part of the oblique extension part 33 arranged in a position between a front seat 90 and a rear seat 92 is the part arranged in the position where the feet of the occupant are located. The groove 26 which can house the foot arrangement part 34 is formed in the silencer body 22. The cover 50 is attached to the groove 26.

However, the arrangement route of the wire harness 30 is not limited thereto described above. The wire harness 30 may have a part arranged to obliquely extending from a lateral on the front side toward a center on the rear side in the vehicle, a part arranged to cross straight in a width direction of the vehicle, or a part longitudinally arranged straight in a front-rear direction of the vehicle in a position other than the center extension part 31 and the lateral extension part 32. The groove 26 which can house a part other than the foot arrangement part 34 may be formed in the silencer body 22, and furthermore, the cover 50 may be attached to the groove 26.

The lateral extension part 32 of the wire harness 30 is arranged in a rocker part, for example. At this time, the lateral extension part 32 is not a part arranged on the silencer 20. However, the lateral extension part 32 may also be arranged on the silencer 20.

When many electrical wires 36 are disposed in the lateral extension part 32, the lateral extension part 32 gets thick. The rocker part which houses the lateral extension part 32 needs to be widened so that the thick lateral extension part 32 is arranged in the rocker part. Considered in this case is that the rocker part is widened by increasing a height of the rocker part, for example. However, a getting on/off property of the occupant may decrease if the height of the rocker part increases in an area around a door part.

In contrast, the wire harness 30 is provided with the center extension part 31 and the oblique extension part 33 herein, thus it can be suppressed that many the electrical wire 36 are disposed in the lateral extension part 32 around the door part. As a result, the height of the rocker part can be reduced, thus the getting on/off property can be increased.

There is a low possibility of stepping on a part of the wire harness 30 arranged in a position overlapping with the front seat 90, the rear seat 92, or a center console 94, for example, on the silencer 20 in a plan view, thus a protection structure using the groove 26 and the cover 50 is not necessary. However, the protection structure using the groove 26 and the cover 50 may also be adopted in this part.

In the example illustrated in FIG. 2, the part of the wire harness 30 housed in the groove 26 is bound by a binding member not shown so that the horizontal section has a circular shape, however, it is not a necessary configuration. For example, there may also be case where the part of the wire harness 30 other than the part covered by the cover 50 is bound by a binding member, and the part covered by the cover 50 is not bound by the binding member. There may also be a case where the wire harness 30 is flatly formed, for example. The flat wire harness is described in detail hereinafter.

When the part of the wire harness 30 housed in the groove 26 is bound by the binding member not shown, it is considered that an adhesive tape is wound around the wire harness 30 overlappingly or roughly, so the wire harness 30 is bound, for example. At this time, the part of the wire harness 30 housed in the groove 26 is preferably bound loosely. Thus, when the wire harness 30 is pressed from a lateral side, the wire harness 30 can be deformed in a direction to be flattened, in other words, deformed so that the horizontal section has an elliptical shape, thus it is suppressed that a strong force is locally applied.

The cover 50 is disposed in the groove 26 to cover the wire harness 30 arranged in the groove 26. Specifically, the cover 50 includes a pair of legs 52 and a lid 54.

The pair of legs 52 covers both lateral sides of the wire harness 30 housed in the groove 26. In the example illustrated in FIG. 2, the pair of legs 52 parallelly extends. However, the legs 52 may extend so that a distance between the legs 52 decreases toward a bottom side of the groove 26, or may extend so that the distance increases. Each of the legs 52 is preferably formed along a normal line direction with respect to a main surface of the lid 54, or formed to extend outward with increasing distance from the lid 54. Accordingly, the legs 52 are easily deformed to extend outward when the force is applied on the lid 54, thus the force can be easily let out.

In the example illustrated in FIG. 2, a distance between outward surfaces of the pair of legs 52 is set to have the same size as a width dimension of the groove 26. Thus, the pair of legs 52 is close up to side surfaces of the groove 26. Thus, a looseness of the cover 50 housed in the groove 26 is suppressed. Particularly herein, the whole outward surfaces of the pair of legs 52 are close up to the side surfaces of the groove 26. As described above, even when the pair of legs 52 is close up to the side surfaces of the groove 26, the silencer body bows, thus the pair of legs 52 can be deformed to extend outward when the force is applied on the lid 54. However, the pair of legs 52 may not be close up to the side surfaces of the groove 26. When the pair of legs 52 are disposed to have a space between the pair of legs 52 and the side surfaces of the groove 26, the legs 52 are easily deformed to extend outward when the force is applied on the lid 54, thus the force can be easily let out.

The lid 54 covers an upper side of the wire harness 30 housed in the groove 26. The lid 54 couples the pair of legs 52 together. The lid 54 is formed lower in height than the main surface 24 of a part of the silencer 20 adjacent to the groove 26.

Herein, the cover 50 is provided on the groove 26 housing the oblique extension part 33. Particularly herein, the cover 50 is provided on the groove 26 housing the foot arrangement part 34 in the oblique extension part 33. In the example illustrated in FIG. 1, the cover 50 is located in the position where the feet of the occupant are located when the occupant sits in the rear seat 92. However, the cover 50 may be provided on a part of the wire harness 30 other than the foot arrangement part 34.

The cover 50 is formed separately from the silencer 20 and the carpet 60. The cover 50 is harder than the silencer 20 and the carpet 60. The cover 50 is, for example, an integrally-molded member using rigid plastic as a material, for example.

The cover 50 is open at a bottom side of the groove 26. Thus, as illustrated in FIG. 3, the cover 50 can be put on the wire harness 30 being housed in the groove 26. Needless to say, the wire harness 30 to which the cover 50 is attached gets housed in the groove 26.

In the example illustrated in FIG. 3, the cover 50 is formed so that the shape or a size, for example, of the horizontal section does not change along an extension direction, but may be formed so that the shape or the size changes. At this time, the cover 50 may be formed so that the shape or the size, for example, of the horizontal section changes in accordance with the change of the shape or the size, for example, of the horizontal section of the groove 26, or the cover 50 may be formed so that the shape or the size, for example, of the horizontal section changes regardless of the groove 26. In the example illustrated in FIG. 3, the cover 50 is provided entirely on the groove 26 in the extension direction of the groove 26, however, there may be a case where the cover 50 is not partially provided on the groove 26. For example, when the groove 26 is formed to have both the straight portion and the curved portion, the cover 50 may be provided only on the straight portion.

The carpet 60 covers the silencer 20. A material constituting the carpet 60 and a manufacturing method thereof are not particularly limited, but the carpet 60 is formed of a known material by a known manufacturing method. The carpet 60 is an interior member having a design surface exposed to an inside of the vehicle. There may also be a case where a floor mat, for example, is further put on a part of the carpet 60 being easily abraded or getting dirty.

The carpet 60 also covers the groove 26 and the cover 50. At this time, the lid 54 is formed lower in height than the main surface 24 of the part of the silencer 20 adjacent to the groove 26, thus the part of the carpet 60 covering the lid 54 does not protrude to the inside of the vehicle, and an influence on the design surface is suppressed.

<Motion>

Figure 4:
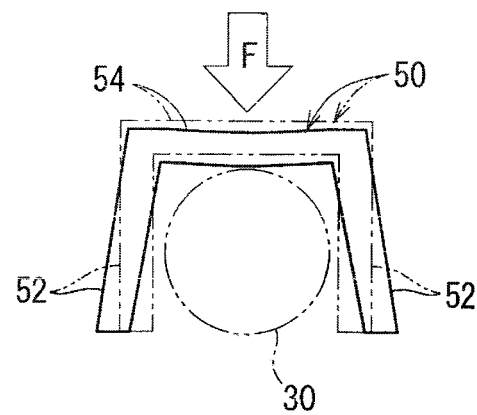
FIG. 4 An explanation diagram illustrating a motion of a cover at a time of applying a stepping force on the cover.

FIG. 4 is an explanation diagram illustrating a motion of the cover 50 at a time of applying a stepping force F on the cover 50. The cover 50 indicated by an alternate long and two short dashes line in FIG. 4 indicates a state of the cover 50 before applying the stepping force F, that is to say, a state before deformation, and the cover 50 indicated by a solid line indicates a state of the cover 50 deformed after applying the stepping force F.

The cover 50 is open at the bottom side of the groove 26. Thus, when the stepping force F is applied, the cover 50 is deformed so that an opening is opened as illustrated in FIG. 4. Accordingly, the lid 54 is easily deformed to be wholly lowered in position instead of being deformed to largely recess. Furthermore, the cover 50 is open at the bottom side of the groove 26, thus the wire harness 30 is located on the silencer body 22. Thus, even when the wire harness 30 is pressed by the lid 54, the silencer body 22 bows, thereby a large force is hardly applied on the wire harness 30. Particularly, the force is hardly diffused when the wire harness 30 presses the silencer body 22, thus the silencer body 22 can largely bow. Accordingly, it hardly occurs that the lid 54 partially presses the wire harness 30 hard.

In the meanwhile, in a case where the cover 50 is not open at the bottom side of the groove 26, that is to say, in a case where the cover 50 has the bottom connecting ends of the pair of legs 52 and facing with the lid 54, the pair of legs 52 hardly extends outward when the stepping force is applied on the cover 50, thus there is a possibility that the lid 54 is locally lowered in position. The wire harness 30 is located on the bottom in the cover 50, so that the wire harness 30 is sandwiched between the lid 54 and the bottom in the cover 50. Furthermore, the force is diffused when the bottom of the cover 50 presses the silencer body 22, thus it is difficult that the silencer body 22 largely bows. Accordingly, the wire harness 30 may be partially pressed hard.

<Effect Etc.>

According to the wire harness arrangement structure 10 in the present embodiment, the cover 50 is open at the bottom side of the groove 26, thus the cover 50 can be put above the wire harness 30 being housed in the groove 26. Furthermore, since the cover 50 is open at the bottom side of the groove 26, the cover 50 can be deformed to extend outward in an opening side when a lid 54 side of the cover 50 is stepped, thus the force can be easily let out. Accordingly, measures against the stepping by the occupant can be easily implemented. Particularly, the groove 26 and the cover 50 are provided on the position where the feet of the occupant sitting in the seat are located, thus the measures against the stepping can also be easily implemented in a part where the stepping may constantly occur.

The measures against the stepping by the occupant can be implemented, thus a degree of freedom of the route of the wire harness 30 can be increased. As a result, the number of the electrical wires 36 disposed in the rocker part can be reduced, thus the getting on/off property can be increased. A part of the wire harness 30 conventionally disposed to be diverted can be shortened, thus a weight can be reduced.

The cover 50 is the different member from the silencer 20 and the carpet 60, thus stiffness of the cover 50 can be easily increased.

The lid 54 is formed lower in height than the main surface 24 of the part of the silencer 20 adjacent to the groove 26, thus when a region in the silencer 20 including the groove 26 is stepped, the part adjacent to the groove 26 is stepped in advance of the cover 50. Accordingly, a feeling of strangeness occurring in stepping a hard member can be reduced.

Second Embodiment

Figure 5:
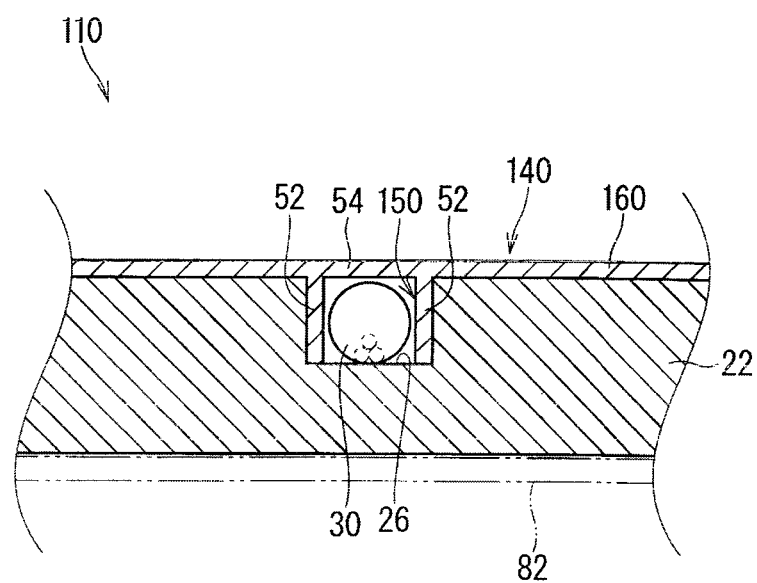
FIG. 5 A cross-sectional view of a wire harness arrangement structure according to a second embodiment.

A wire harness arrangement structure according to a second embodiment is described. FIG. 5 is a cross-sectional view illustrating a wire harness arrangement structure 110 according to the second embodiment. In the following description of the present embodiment, the same reference numerals are assigned to the similar constituent elements described above, and the description thereof will be omitted.

The wire harness arrangement structure 110 according to the present embodiment is different from the wire harness arrangement structure 10 according to the first embodiment in that a carpet is integrally formed with a cover.

In integrated body 140 in which the carpet and the cover are integrally formed, a material constituting a cover part 150 and a material constituting a carpet part 160 may be formed of the same material, or may be formed of a material different from each other. The integrated body 140 may be an integrally-molded body, or may be formed by bonding the cover part 150 and the carpet part 160 which have been separately molded. For example, when the integrated body 140 is the integrally-molded body and the material constituting the cover part 150 and the material constituting the carpet body 160 are different from each other, the integrated body 140 is considered to be formed using two-color molding, for example.

When the carpet is integrally formed with the cover, particularly when the integrated body 140 is the integrally-molded body, the carpet part 160 may double as the lid 54 in the cover 50.

According to the wire harness arrangement structure 110 in the present embodiment, the carpet is integrally formed with the cover, thus the number of components which needs to be mounted on the vehicle can be reduced. That is to say, in the wire harness arrangement structure 10 according to the first embodiment, there is need to separately manage and mount the cover 50 and the carpet 60, however, according to the wire harness arrangement structure 110 in the present embodiment, the integrated body 140 in which the cover and the carpet are integrally formed only needs to be managed and mounted.

Third Embodiment

Figure 6:
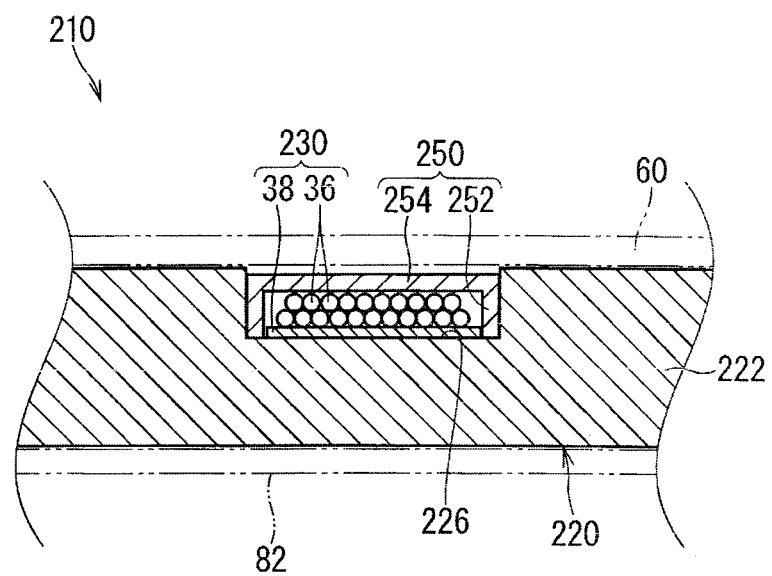
FIG. 6 A cross-sectional view of a wire harness arrangement structure according to a third embodiment.

A wire harness arrangement structure according to a third embodiment is described. FIG. 6 is a cross-sectional view illustrating a wire harness arrangement structure 210 according to the third embodiment. In the following description of the present embodiment, the same reference numerals are assigned to the similar constituent elements described above, and the description thereof will be omitted.

In the wire harness arrangement structure 210 according to the present embodiment, a shape of a part of a wire harness 230 housed in a groove 226 is different from that of the wire harness 30 housed in the groove 26 in the wire harness arrangement structure 10 described above.

Specifically, the part of the wire harness 230 housed in the groove 226 is flatly formed. Herein, the wire harness 230 is flattened using a sheet member 38. That is to say, the plurality of electrical wires 36 are arranged on and fixed to the sheet member 38, thus the wire harness 230 is flattened. At this time, a method of fixing the electrical wires 36 to the sheet member 38 is not particularly limited, but can be appropriately selected from sewing, welding, bonding using a two-side adhesive tape or an adhesion agent, for example. The wire harness 230 may be flattened without using the sheet member 38.

Herein, the groove 226 and a cover 250 are also flattened in accordance with the flattened wire harness 230. That is to say, the groove 226 is formed more shallowly than the groove 26 described above. A pair of legs 252 in the cover 250 is formed shorter than the pair of legs 52 described above, and each of legs 252 is located farther away from each other. Thus, a lid 254 in the cover 250 is formed larger than the lid 54 described above.

According to the wire harness arrangement structure 210 according to the present embodiment, the part of the wire harness 230 housed in the groove 226 is flatly formed, thus a depth of the groove 226 can be reduced. Accordingly, a reduction in a thickness of a part of a silencer body 222 located between the groove 226 and the floor panel 82 can be suppressed, thus a reduction in sound insulating properties of a silencer 220 can be suppressed.

The configurations described in the embodiments and modification examples thereof can be appropriately combined as long as they are not contradictory.

For example, there may also be a case where in one vehicle, the wire harness arrangement structures 10 and 110 described above, in which the wire harness 30 has the circular cross-sectional shape, and the wire harness arrangement structure 210 described above, in which the wire harness 230 has the flat shape, are used in combination. Considered in this case is that, for example, the wire harness arrangement structure 10 described above, in which the wire harness 30 has the circular cross-sectional shape, is adopted to a relatively thick part of the silencer bodies 22 and 222, and the wire harness arrangement structure 210, in which the wire harness 230 has the flat shape, is adopted to a relatively thin part thereof.

For example, there may also be a case where in one vehicle, the wire harness arrangement structures 10 and 210 described above, in which the covers 50 and 250 and the carpet 60 are separately formed, and the wire harness arrangement structure 110 described above, in which the cover and the carpet constitute the integrated body 140, are used in combination. Considered in this case is that, for example, the wire harness arrangement structures 10 and 210 described above, in which the covers 50 and 250 and the carpet 60 are separately formed, are adopted to a part where the cover is relatively hard to house in the groove, and the wire harness arrangement structure 110, in which the cover and the carpet constitute the integrated body 140, is adopted to a part where the cover is relatively easy to house in the groove.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10 wire harness arrangement structure
20 silencer
22 silencer body
24 main surface
26 groove
30 wire harness
36 electrical wire
38 sheet member
50 cover
52 leg
54 lid
60 carpet
80 vehicle body
82 floor panel

The invention claimed is:

1. A wire harness arrangement structure in a vehicle, comprising:
   a silencer including a silencer body with a groove recessed in a thickness direction formed in a main surface of the silencer body;
   a wire harness, at least a part of which is housed in the groove; and
   a cover which includes a pair of legs covering both lateral sides of the wire harness housed in the groove and a lid covering an upper side of the wire harness housed in the groove and coupling the pair of legs together, and which is open at a bottom side of the groove wherein
   the cover is formed harder than the silencer,
   the cover is formed to be deformable so that the lid recesses and an opening at the bottom side of the groove extends outward when a force in a normal line direction with respect to a main surface of the lid is applied on the lid, and
   the silencer can be deformed so that a part supporting the wire harness bows when the lid presses the wire harness in deformation of the cover.

2. The wire harness arrangement structure according to claim 1, further comprising
   a carpet covering the silencer, wherein
   the cover is formed separately from the carpet, using rigid plastic as a material.

3. The wire harness arrangement structure according to claim 2, wherein
   the lid is formed lower in height than a main surface of a part of the silencer adjacent to the groove.

4. The wire harness arrangement structure according to claim 1, further comprising
   a carpet covering the silencer and integrally formed with the cover.

5. The wire harness arrangement structure according to claim 1, wherein
   the part of the wire harness housed in the groove is flatly formed.

6. The wire harness arrangement structure according to claim 1, wherein
   the wire harness has a foot arrangement part arranged in a position where feet of an occupant are located, and
   the groove and the cover are provided on the foot arrangement part.

* * * * *